(12) United States Patent
Emery

(10) Patent No.: US 7,427,712 B2
(45) Date of Patent: Sep. 23, 2008

(54) APPARATUS AND METHOD TO PREVENT LOSS OF CONDUCTIVE GROUND ELECTRODE

(75) Inventor: Franklin T. Emery, Charlotte, NC (US)

(73) Assignee: Siemens Power Generation, Inc., Orlando, FL (US)

( * ) Notice: Subject to any disclaimer, the term of this patent is extended or adjusted under 35 U.S.C. 154(b) by 353 days.

(21) Appl. No.: 11/285,835

(22) Filed: Nov. 22, 2005

(65) Prior Publication Data

US 2007/0114052 A1 May 24, 2007

(51) Int. Cl.
*H01B 11/06* (2006.01)
(52) U.S. Cl. .................. 174/36; 174/110 R; 174/120 R; 174/120 C
(58) Field of Classification Search ............. 174/110 R, 174/117 R, 117 F, 117 FF, 120 R, 120 C, 174/124 R, 126.1, 126.4, 129 R
See application file for complete search history.

(56) References Cited

U.S. PATENT DOCUMENTS

| 4,160,926 | A | * | 7/1979 | Cope et al. ................... 310/215 |
| 4,400,226 | A | * | 8/1983 | Horrigan ..................... 156/56 |
| 4,427,740 | A | * | 1/1984 | Stackhouse et al. ......... 428/324 |
| 4,661,397 | A | * | 4/1987 | Kwiecinski et al. ........... 442/72 |
| 4,724,345 | A | * | 2/1988 | Elton et al. ................... 310/45 |
| 4,734,976 | A | * | 4/1988 | Matson ........................ 29/606 |
| 6,190,775 | B1 | * | 2/2001 | Smith et al. .................. 428/417 |
| 2002/0029897 | A1 | * | 3/2002 | Younsi et al. ........... 174/120 R |

* cited by examiner

*Primary Examiner*—William H Mayo, III

(57) ABSTRACT

High voltage coils (40) having an insulated coil surface that includes a composite tape (32) bonded to a secondary conductive layer (34) in a half lap manner. The composite layer comprising a glass conductive tape bonded to a layer of mica paper tape in an edge lap manner.

10 Claims, 2 Drawing Sheets

APPARATUS AND METHOD TO PREVENT LOSS OF CONDUCTIVE GROUND ELECTRODE

FIELD OF THE INVENTION

The field of the invention relates to apparatuses and methods for preventing or reducing loss of conductive ground electrodes caused by locally enhanced stress points. More specifically, the invention is related to methods and apparatuses for preventing loss of conductive ground electrodes in stator coils for electric generators. However, the invention is not limited to use in stator coils for electric generators.

BACKGROUND

All high voltage coils use an outer conductive ground electrode to make certain the outer surface of the high voltage coils is at ground potential. As illustrated in FIG. 1, the ground wall insulation 10 of high voltage stator coils is generally comprised of multiple layers of glass backed mica paper tape 14. The last outer layer is a conductive tape 12 that is loaded with carbon or graphite to control and set its conductivity. During the impregnation and heat cure of the stator coil, shrinkage occurs in the conductive tape 12, which causes the tape to conform to the surface below it.

Currently, the layer of conductive tape 12 is placed on the insulated coils surface in a half lap layer manner (described herein) and applied over the last layer of mica paper tape 14 that is also placed on the coil surface in a half lap layer. This method, while somewhat successful, causes protrusions of either the conductive tape 12 or the mica layer 14.

The smoothness of the conductive tape 12 layer has a big influence on the electrical properties of the other ground electrode. Protrusions 16 of either the conductive tape 12 or the mica tape 14 below it can produce regions of locally enhanced electrical stress. The protrusions 16 created by the crevice created by the half lap interface of the glass backed mica paper tape 14 results in a very pronounced local electrical stress point 16, as illustrated in FIG. 1.

In addition, increased local electrical stress can cause locally produced partial discharges, which can lead to damage of the coil's outer ground electrode. Calculations can estimate the magnitude of the increased electrical stress at the tip of the conductive tape protrusion. The following calculation may be used to estimate the magnitude of this effect:

$$\eta = (2d)/[r \ln(r+4d)/r]]$$

where $\eta$ is the stress enhancement factor; r is the radius of the conductive point and d is the point to plane distance. The stress enhancement is the amount by which the electric field at the tip is increased because of the protrusion of the conductive tape into the crevice of the glass backed mica paper tape.

What is needed is a method that wraps the outer conductive ground electrode with conductive tape 12 such that the conductive tape 12 and the surface to which it is applied, are as smooth as possible, i.e. having minimal protrusions, thereby reducing the enhanced electrical stress on the ground electrode.

Other difficulties with the prior art also exist, some of which will be apparent upon further reading.

SUMMARY OF THE INVENTION

In summary, and in one embodiment of the invention, a method for reducing electrical stress from outer conductive ground electrodes of the type used to protect high voltage coils having insulated coil surfaces is provided that comprises applying a composite layer to the insulated high voltage coil surface, bonding the composite layer to the insulated high voltage coil surface, applying a second conductive layer to the composite layer and bonding the second conductive layer to the secondary insulation layer. In a first embodiment of the invention, the first conductive layer is applied in an edge lap or butt lap manner, i.e. the first conductive layer is of a single thickness about the insulated high voltage coil and comprises at least one conductive material.

In a second embodiment of the invention, a method for reducing electrical stress from outer conductive ground electrodes of the type used to protect high voltage coils having an insulated coil surface is provided that comprises applying a composite layer to the insulated high voltage coil surface using an edge lap method, the composite layer comprising a first conductive layer bonded to a secondary insulation layer, wherein the first conductive layer is of a single thickness about the insulated high voltage coil, and wherein the first conductive layer comprises at least one conductive material. In this embodiment, the secondary insulation layer is of a single thickness about the conductive layer. The composite layer is bonded to the insulated high voltage coil surface and applied to a second conductive layer using a half lap method. The second conductive layer is of a first thickness that is at least two times the thickness of the first conductive layer about at least one portion of the insulated high voltage coil surface and of a second thickness that is different from the first thickness in at least one other portion of the insulated coil surface. The second conductive layer is bonded to the secondary insulation layer. The composite layer is about 0.007 inches thick and about two inches wide.

In a third embodiment of the invention, a method is provided that comprises applying a composite tape to the insulated high voltage coil surface using an edge lap method, the composite tape comprising glass conductive tape bonded to a layer of mica paper tape, wherein the composite tape is about 0.007 inches thick and about two inches wide. The composite tape is bonded to the insulated high voltage coil surface. A second conductive tape is applied to the composite tape using the half lap application method and bonded to the composite tape. In this embodiment, the second conductive tape is about two inches wide and about 0.007 inches thick.

In a fourth embodiment of the invention the apparatus produced by the above method is provided, the apparatus comprises a composite layer bonded to a secondary conductive layer, the composite layer comprising a first conductive layer bonded to a secondary insulation layer, wherein the first conductive layer is of about a single thickness, wherein the first conductive layer comprises at least one conductive material, wherein the secondary insulation layer is of a single thickness about the conductive layer and wherein the second conductive layer is of a first thickness that is at least two times the thickness of at least one other portion of the insulated coil surface.

In a fifth embodiment, an apparatus for reducing electrical stress from outer conductive ground electrodes of the type used to protect high voltage coils having an insulated coil surface is provided that comprises a composite layer bonded to a secondary conductive layer in a half lap method, the composite layer comprising a first conductive layer bonded to a secondary insulation layer in an edge lap method, wherein the first conductive layer is of about a single thickness and comprises at least one conductive material. The composite layer is about 0.007 inches thick and about two inches wide.

In a sixth embodiment of the invention, an apparatus for reducing electrical stress from outer conductive ground electrodes of the type used to protect high voltage coils having an insulated coil surface is provided that comprises a composite tape bonded to a secondary conductive tape in a half lap method, the composite tape comprises a glass conductive tape bonded to a layer of mica paper in an edge lap method. The composite tape is about 0.007 inches thick and about two inches wide.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

The present invention provides for methods and apparatuses for reducing electrical stress from outer conductive ground electrodes of the type used to protect high voltage coils having insulated coil surfaces. Generally, the method of the invention comprises applying a composite layer to the insulated high voltage coil surface, bonding the composite layer to the insulated high voltage coil surface, applying a second conductive layer to the composite layer and bonding the second conductive layer to the secondary insulation layer. In a first embodiment of the invention, the first conductive layer is applied in an edge lap or butt lap manner, i.e. the first conductive layer is of a single thickness about the insulated high voltage coil and comprises at least one conductive material.

In this particular embodiment, the secondary insulation layer is of a single thickness about the conductive layer. The second conductive layer is of a first thickness that is at least two times the thickness of at least one other portion of the first conductive layer about at least one portion of the insulated high voltage coil surface and of a second thickness that is different from the first thickness in at least one other portion of the insulated coil surface.

Figure 1:
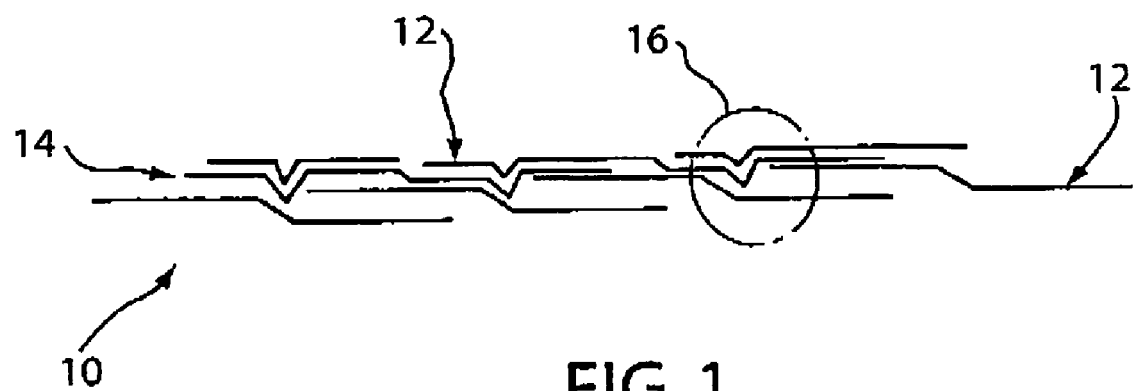
FIG. 1 illustrates the current outer conductive ground electrode coils having conductive tape applied in a half lap manner over the last layer of glass backed mica paper tape.

Currently, conductive tape 12 is applied over insulation tape 14 using the half lap application method described herein. The ground wall insulation of the high voltage coils is generally multiple layers of glass backed mica paper tape 14. The outer layer is a conductive tape 12 that is generally loaded with carbon or graphite to control and set its conductivity. During the impregnation and heat cure of the stator coil, about 10% shrinkage occurs in the conductive tape 12. The shrinkage of the conductive tape 12 causes the tape 12 to conform to the surface below it. The surface below it is a half lap layer of glass backed mica paper tape 14, generally. Protrusions 16 are developed in the conductive tape 12 at each edge of the mica tape 14 below it, as illustrated in FIG. 1. The shrinkage of the conductive tape 12 causes the conductive tape 12 to protrude down into the crevice created by the half lap interface of the glass backed mica paper tape 14. The protrusion 16 results in a very pronounced local electrical stress point.

For a typical coil with conductive tape 12 applied over a layer of glass backed mica paper tape 14, r=0.006 inches, d=0.126 inches, and $\eta$=9.4. This means that the electrical stress at the protrusion is 9.4 items the electrical stress across the coils ground wall insulation. This can result in partial discharge development at these sites, which in turn can result in local damage to the resin and damage to the conductive electrode.

Figure 2:
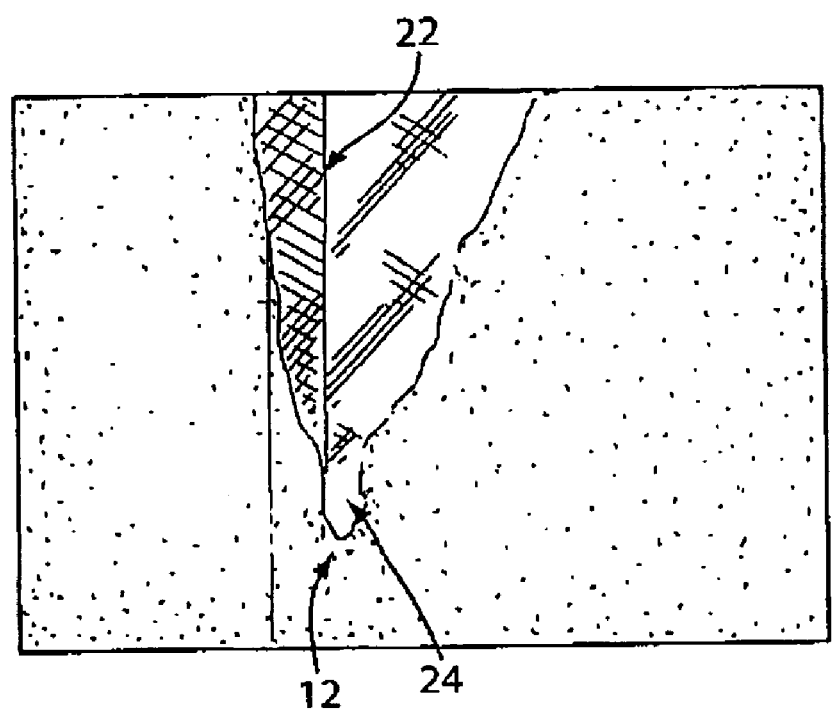
FIG. 2 is a photograph showing an eroded ground electrode on stator coil that was subject to a voltage endurance test.

When these partial discharges are allowed to occur, surface discharge erosion can occur in the coils outer ground electrode. If the erosion in the outer ground electrode is allowed to progress extensive failure of the other ground electrode may occur. And, if the activity is allowed to continue, over time it is possible for complete coil ground wall failure. FIG. 2 illustrates burn through of the conductive layer 12 when applied in the traditional half lap manner. The initiation site 24 is at the edge lap 22 of the mica tape that lies below the conductive layer. The initiation site 24 is not at the conductive tape overlap area. FIG. 2 also illustrates that erosion is from the underside of the conductive tape outer surface.

In order to prevent the discharges that occur from eroding the conductive electrode, the protrusions must be prevented or at least minimized in both size and quantity. The present invention accomplishes this goal by providing methods for applying the conductive layer to a smooth, but rigid surface.

Generally, the high voltage coil surface 40 is insulated prior to practicing the methods of the invention. However, the high voltage coil may be insulated in accordance with the invention. The high voltage coil may be insulated by any known method in accordance with the invention. In a specific embodiment of the invention coil is insulated by at least one of glass-backed mica paper tape and vacuum pressure impregnation, or both.

Figure 3:
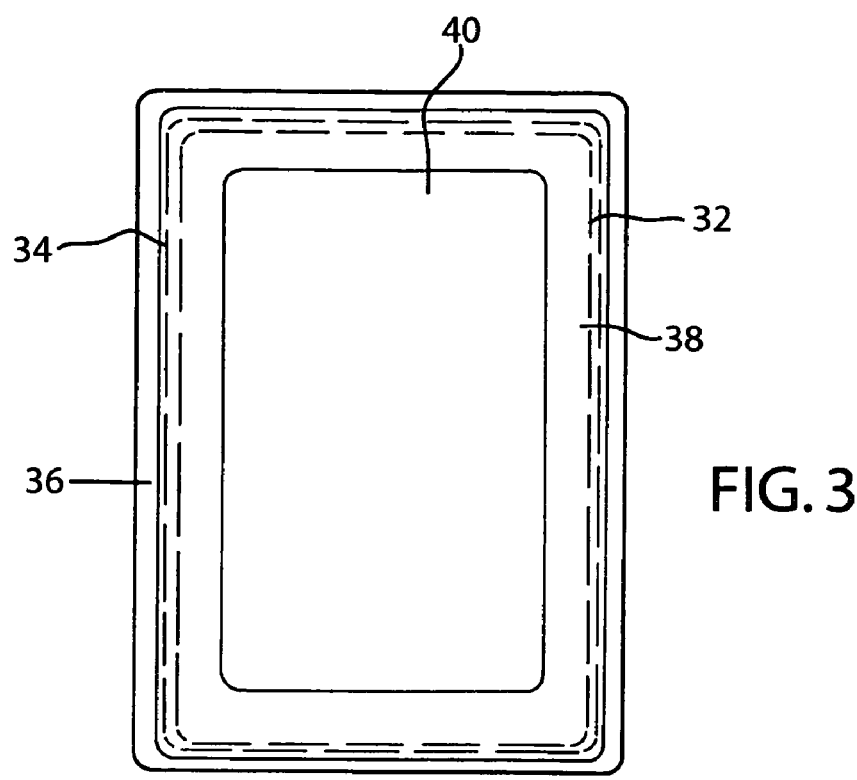
FIG. 3 is an illustration of a high voltage coil cross-section showing the insulation and conductive layers.
Figure 4:
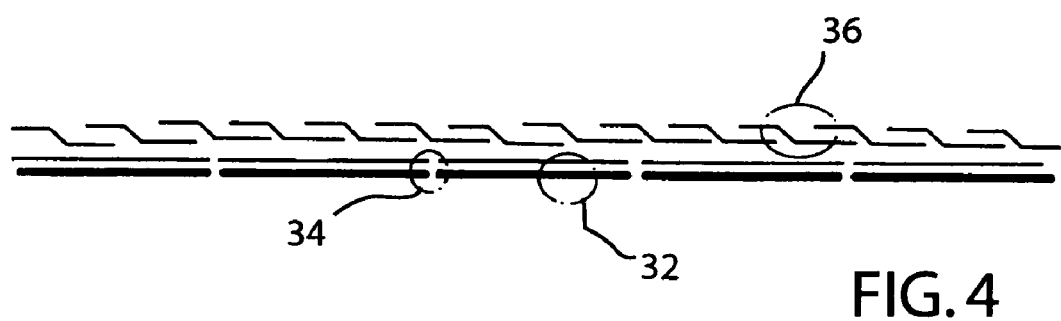
FIG. 4 is a cross-section of a high voltage coil cross-section, illustrating an edge lap application.

With reference to FIGS. 3-4, the composite layer of the invention comprises a first conductive layer 32 that is bonded to a secondary insulation layer 34. Generally, and in one embodiment of the invention, the composite layer is about 0.007 inches thick. In another embodiment of the invention, the composite layer is about two inches wide. In a specific embodiment of the invention, the composite layer is about two inches wide and about 0.007 inches thick. The primary insulation layer is illustrated as reference number 38.

The first conductive layer 32 of the invention may comprise any material capable of conducting electricity. The first conductive layer 32 may be of any thickness that does not hinder electricity to travel there though. In one embodiment, the first conductive layer 32 is about 0.004 inches thick. In one embodiment of the invention, the conductive layer has a resistance of about 100 to about 500 ohms per square before it is bonded to the secondary insulation layer. In one specific embodiment of the invention, the first conductive layer 32 comprises a glass conductive tape. In another specific embodiment of the invention, the conductive layer comprises a conductive tape that is about two inches wide. In yet another specific embodiment of the invention, the conductive layer comprises a glass conductive tape that is about two inches wide. The first conductive layer 32 comprises carbon loading on glass fabric in alternative embodiments of the invention.

The secondary insulation layer 34 may comprise any materials adapted to provide insulation to the underlying coil 40. In one embodiment of the invention, the secondary insulation layer 34 comprises mica paper. In another embodiment of the invention, the secondary insulation layer 34 comprises at least one polyester film. In yet another embodiment of the invention, the secondary insulation layer 34 comprises at least one polyimide film. A polyimide film suitable for use in the apparatuses and methods of the invention is sold under the trade name Kapton® by E.I. du Ponte de Nemours and Company.

The first conductive layer 32 and the secondary insulation layer 34 are applied to the insulated coil surface 40 using an edge lap or butt lap method in accordance with the invention. The edge lap method comprises placing the layers side by side so that no gaps exist between the layers and such that the layers to not overlap. As used herein, "butt lap" and "edge lap" have the same meaning. As such, when the first conductive layer 32 is applied and bonded to the secondary insulation layer 34, the first conductive layer 32 is of about a single thickness about the insulated high voltage coil 40. It should be noted that the phrase "a single thickness" is not meant to exclude slight variations in the thickness of the layers.

In accordance with the methods and apparatuses of the invention, the second conductive layer 36 is applied to the insulated coil 40 using a half lap application method. The half lap application method comprises wrapping each layer over the previous layer such that the top layer lies over about half of the previous layer, i.e. the edge of the top layer lies in the middle of the previous layer. When the half lap method is employed the resulting layer is of at least two thicknesses on two different portions of the coil 40. The layer is at least two times the thickness of the first conductive layer 32 about at least one portion of the insulated high voltage coil surface 40 and of a second thickness that is different from the first thickness in at least one other portion of the insulated coil surface 40. Of course, as one skilled in the art will recognize, the half lap application method creates layers that are of varying thicknesses.

The secondary insulation layer 34 comprises any material capable of providing at least some insulation for the high voltage coil 40. In one embodiment, the secondary insulation layer 34 comprises mica paper. In another embodiment of the invention, the secondary insulation layer 34 comprises at least one polyester film. In yet another embodiment of the invention, the secondary insulation layer 34 comprises at least one polyimide film. The secondary insulation layer 34 may be of any thickness that does not eliminate its insulation capabilities. In a specific embodiment of the invention, the secondary insulation layer 34 is about 0.003 inches thick. In a more specific embodiment of the invention, the secondary insulation layer 34 is mica paper that is about 160 grams per meter square.

In a specific embodiment of the invention, a method for reducing electrical stress from outer conductive ground electrodes of the type used to protect high voltage coils 40 having an insulated coil surface 40 comprises applying a composite layer to the insulated high voltage coil surface 40 using an edge lap method, the composite layer comprising a first conductive layer 32 bonded to a secondary insulation layer 34, wherein the first conductive layer 32 is of a single thickness about the insulated high voltage coil 40, and wherein the first conductive layer 32 comprises at least one conductive material. In this embodiment, the secondary insulation layer 34 is of a single thickness about the conductive layer. The composite layer is bonded to the insulated high voltage coil surface 40 and applied to a second conductive layer 36 using a half lap method. The second conductive layer 36 is of a first thickness that is at least two times the thickness of the first conductive layer 32 about at least one portion of the insulated high voltage coil surface 40 and of a second thickness that is different from the first thickness in at least one other portion of the insulated coil surface 40. The second conductive layer 36 is bonded to the secondary insulation layer 34. The composite layer is about 0.007 inches thick and about two inches wide.

In another specific embodiment of the invention, the method of the invention comprises applying a composite tape to the insulated high voltage coil surface 40 using an edge lap method, the composite tape comprising glass conductive tape bonded to a layer of mica paper tape, wherein the composite tape is about 0.007 inches thick and about two inches wide. The composite tape is bonded to the insulated high voltage coil surface 40. A second conductive tape is applied to the composite tape using the half lap application method and bonded to the composite tape. In this embodiment, the second conductive tape is about two inches wide and about 0.007 inches thick.

The various embodiments of the invention produce specific apparatuses that are all contemplated to be within the scope of the present invention. As such, and in one specific embodiment of the invention, an apparatus for reducing electrical stress from outer conductive ground electrodes of the type used to protect high voltage coils 40 having an insulated coil surface 40 comprises a composite layer bonded to a secondary conductive layer in a half lap method, the composite layer comprising a first conductive layer 32 bonded to a secondary insulation layer 34 in an edge lap method, wherein the first conductive layer 32 is of about a single thickness and comprises at least one conductive material. The composite layer is about 0.007 inches thick and about two inches wide.

In another specific embodiment of the invention, an apparatus for reducing electrical stress from outer conductive ground electrodes of the type used to protect high voltage coils 40 having an insulated coil surface 40 comprises a composite tape bonded to a secondary conductive tape in a half lap method, the composite tape comprises a glass conductive tape bonded to a layer of mica paper in an edge lap method. The composite tape is about 0.007 inches thick and about two inches wide.

The various methods of the invention produce the apparatuses of the invention. Any apparatus produced using the methods of the invention described herein are contemplated to be within the scope of the present invention.

One specific embodiment of the apparatuses of the invention was tested and compared to traditional outer conductive ground electrodes. The special composite tape was made up of a layer of conductive tape, which used carbon loading on glass fabric. The resistance of the conductive tape was on the order of 100 to 500 ohms per square before impregnation. The conductive tape was bonded to a layer of mica paper that was about 0.003 inches thick. Mica paper of 160 gm/meter square was used. The composite tape width was about 2 inches. The thickness of the conductive portion of the tape was 0.004 inches thick. The composite tape thickness was on the order of 0.007 inches thick. The tape was applied to the insulated coil surface 40 with the mica paper up and was applied in a butt or edge lap method. As such, very little or no space remained between adjacent tape edges upon application. When the coils 40 were pressed and cured, the edges of the tape touched and provided a continuous electrical connection to form a complete inner ground plane. The upward mica will provided a relatively smooth surface to which the other conductive layer of tape was applied. The mica provides a smooth surface for the outer layer of conductive tape and reduced the likelihood of protrusions that cause high electrical stress points. The inner conductive tape removed the voltage stress of the other layer of conductive tape. The inner conductive tape was well below the surface of the coil 40 in an area of the coil 40 insulation system that was relatively void free and therefore partial discharge free.

In an experiment, the two coils were prepared and voltage endurance testing was conducted on both. The two coils sections after 400 hours of voltage endurance testing at a voltage of 32 kVac and a temperature of 170° C. The upper coil section employed an inner conductive layer that reduced the stress on the outer conductive layer. The lower coil section was prepared in the standard manner, i.e. with the conductive layer being applied in a half lap manner over the ground wall. The upper coil employed a stress-reducing layer and the lower coils section did not.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. An apparatus for reducing electrical stress from outer conductive ground electrodes of the type used to protect high voltage coils having an insulated coil surface, the apparatus comprising:
   a composite layer bonded to a secondary conductive layer, the composite layer comprising
   a first conductive layer bonded to a secondary insulation layer,
      wherein the first conductive layer is of about a single thickness,
      wherein the first conductive layer comprises at least one conductive material,
      wherein the secondary insulation layer is of a single thickness about the conductive layer;
      wherein the secondary conductive layer is of a first thickness that is at least two times the thickness of at least one other portion of the insulated coil surface.

2. The apparatus of claim 1 wherein the first conductive layer adapted to be placed about the insulated coil in an edge lap manner.

3. The apparatus of claim 1 wherein the first conductive layer comprises a glass conductive tape.

4. The apparatus of claim 1 wherein the secondary insulation layer comprises mica paper tape.

5. The apparatus of claim 1 wherein the secondary conductive layer is about the insulated coil in a half lap manner.

6. The apparatus of claim 1 wherein the secondary insulation layer comprises at least one of polyimide film or polyester film.

7. The apparatus of claim 1 wherein the secondary insulation layer is about 0.003 inches thick.

8. The apparatus of claim 1 wherein the first conductive layer is about 0.004 inches thick.

9. The apparatus of claim 1 wherein the composite layer is about 0.007 inches thick.

10. An apparatus for reducing electrical stress from outer conductive ground electrodes of the type used to protect high voltage coils having an insulated coil surface, the apparatus comprising:
   a composite tape bonded to a secondary conductive tape in a half lap manner, the composite layer comprising a glass conductive tape bonded to a layer of mica paper tape in an edge lap manner,
   wherein the composite tape is about 0.007 inches thick and about two inches wide.

* * * * *